United States Patent
Tynys et al.

(10) Patent No.: US 12,227,633 B2
(45) Date of Patent: *Feb. 18, 2025

(54) POLYETHYLENE COMPOSITION FOR PIPE APPLICATIONS WITH IMPROVED SAGGING PROPERTIES

(71) Applicants: ABU DHABI POLYMERS COMPANY LIMITED (BOROUGE), Abu Dhabi (AE); BOREALIS AG, Vienna (AT)

(72) Inventors: Antti Tynys, Abu Dhabi (AE); Jarmo Harjuntausta, Helsinki (FI); Mohana Murali Adhyatmabhattar, Abu Dhabi (AE)

(73) Assignees: ABU DHABI POLYMERS COMPANY LIMITED (BOROUGE), Abu Dhabi (AE); BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,767

(22) Filed: Oct. 26, 2020

(65) Prior Publication Data

US 2021/0070969 A1  Mar. 11, 2021

Related U.S. Application Data

(63) Continuation of application No. 15/107,431, filed as application No. PCT/EP2014/003462 on Dec. 22, 2014.

(30) Foreign Application Priority Data

Dec. 23, 2013 (EP) .................................... 13006049

(51) Int. Cl.
- C08L 23/08 (2006.01)
- C08K 3/04 (2006.01)
- C08L 23/06 (2006.01)
- F16L 9/12 (2006.01)

(52) U.S. Cl.
CPC ............ C08L 23/0815 (2013.01); C08K 3/04 (2013.01); C08L 23/06 (2013.01); F16L 9/12 (2013.01); C08L 2203/18 (2013.01); C08L 2308/00 (2013.01); C08L 2314/02 (2013.01)

(58) Field of Classification Search
CPC ...... C08L 23/04; C08L 23/06; C08L 2203/18; C08L 2205/02; C08L 2205/025; C08L 2308/00; C08L 23/0815; C08L 2314/02; C08K 3/04; F16L 9/16
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,532,311 A | 7/1985 | Fulks et al. |
| 4,582,816 A | 4/1986 | Miro |
| 4,803,251 A | 2/1989 | Goode et al. |
| 4,855,370 A | 8/1989 | Chirillo et al. |
| 5,026,795 A | 6/1991 | Hogan |
| 5,236,998 A | 8/1993 | Lundeen et al. |
| 5,391,654 A | 2/1995 | Ahvenainen et al. |
| 10,889,697 B2* | 1/2021 | Tynys .................. C08F 210/16 |

FOREIGN PATENT DOCUMENTS

| | | |
|---|---|---|
| DE | 19604196 A1 | 8/1997 |
| EP | 0479186 A2 | 4/1992 |
| EP | 0560035 A1 | 8/1993 |
| EP | 0810235 B1 | 11/2004 |
| EP | 1985660 A1 * | 10/2008 |
| EP | 2570455 A1 | 3/2013 |
| EP | 2583998 A1 | 4/2013 |
| WO | 96/19503 A1 | 6/1996 |
| WO | 96/32420 A1 | 10/1996 |
| WO | 00/22040 A1 | 4/2000 |
| WO | 2004/055068 A1 | 7/2004 |
| WO | 2004/055069 A1 | 7/2004 |
| WO | 2005/092974 A1 | 10/2005 |
| WO | 2006/048257 A1 | 5/2006 |
| WO | 2013101767 A2 | 7/2013 |

OTHER PUBLICATIONS

Yan, D. et al Polymer vol. 40 pp. 1737-1744 (Year: 1999).*
International Search Report & Written Opinion issued in PCT/EP2014/003462; dated Feb. 25, 2015.
Busico, et al.; "Alk-I-ene Polymerization in the Presence of a Monocyclopentadienyl Zirconium(IV) Acetamidinate Catalyst: Microstructural and Mechanistic Insights"; Macromolecular Rapid Communications; vol. 28; pp. 1128-1134; (2007).
Castignolles, et al.; "Detection and quantification of branching in polyacrylates by size-exclusion Thromatography (SEC) and melt-state 13C NMR spectroscopy"; Polymer; vol. 50; pp. 2373-2383; (2009).

(Continued)

*Primary Examiner* — Marc S Zimmer
*Assistant Examiner* — Jeffrey S Lenihan
(74) *Attorney, Agent, or Firm* — DITTHAVONG, STEINER & MLOTKOWSKI

(57) ABSTRACT

The present invention relates to a polyethylene composition comprising, a base resin (A) comprising
- a copolymer of ethylene and at least one comonomer selected from alpha-olefins having from three to twelve carbon atoms,
- wherein the ethylene copolymer comprises a low molecular weight component (A-1) and a high molecular weight component (A-2) with the low molecular weight component (A-1) having a lower weight average molecular weight than the high molecular weight component (A-2),
- (B) carbon black in an amount of 1.0 to 10 wt % based on the total amount of the polyethylene composition, and
- (C) optional further additives other than carbon black.

11 Claims, No Drawings

(56) References Cited

OTHER PUBLICATIONS

Kaye, et al.; "Definition of Terms Relating to the Non-Ultimate Mechanical Properties of Polymers"; International Union of Pure and Applied Chemistry; vol. 70; No. 3; pp. 701-754; (1998).

Filip, et al.; "Heteronuclear decoupling under fast MAS by a rotor-synchronized Hahn-echo pulse train"; Journal pf Magnetic Resonance; vol. 176; pp. 239-243; (2005).

Griffin, et al.; "Low-load rotor-synchronised Hahn-echo pulse train (RS-HEPT) H decoupling in solid-state NMR: factors affecting MAS spin-echo dephasing times"; Magnetic Resonance in Chemistry; vol. 45; pp. S198-S208; ,2007).

Heino, et al.; "Rheological Characterization of Polyethylene Fractions"; Theoretical and Applied Rheology; pp. 360-362; (1992).

Heino; "The influence of molecular structure on some rheological properties of polyethylene"; Annual Transactions of the Nordic Rheology Society; vol. 3; pp. 71-73; (1995).

Klimke, et al.; "Optimisation and Application of Polyolefin Branch Quantification by Melt-State 13C NMR Spectroscopy"; Macromolecular Chemistry and Physics; vol. 207; pp. 382-395; (2006).

Parkinson, et al.; Effect of Branch Length on 13C NMR Relaxation Properties in Molten Poly[ethylene-co¬:a-blefin)] Model Systems; Macromolecular Chemistry and Physics; vol. 208; pp. 2128-2133; (2007).

Pollard, et al.; "Observation of Chain Branching in Polyethylene in the Solid State and Melt via 13C NMR Spectroscopy and Melt NMR Relaxation Time Measurements"; Macromolecules; vol. 37; No. 3; pp. 813-825; (2004).

Randall; "A Review of High Resolution Liquid 13Carbon Nuclear Magnetic Resonance Characterizations Df Ethylene-Based Polymers"; Macromolecular Chemistry and Physics; vol. C29; pp. 201-317; (1989).

Scheirs, et al.; "PE100 Resins for Pipe Applications:—Continuing the Development into the 21st Century"; Trends in Polymer Science; vol. 4; No. 12; pp. 408-415; (1996).

Zhou, et al.; "A new decoupling method for accurate quantification of polyethylene copolymer composition and riad sequence distribution with 13C NMR"; Journal of Magnetic Resonance; vol. 187; pp. 225-233; (2007).

International Preliminary Report on Patentability of International Application No. PCT/EP2014/003462 dated Jun. 28, 2016.

* cited by examiner

POLYETHYLENE COMPOSITION FOR PIPE APPLICATIONS WITH IMPROVED SAGGING PROPERTIES

This application is a continuation of and claims the benefit under 35 U.S.C. 120 to U.S. Ser. No. 15/107,431, filed Jun. 22, 2016, which is hereby incorporated by reference herein in its entirety.

BACKGROUND OF THE INVENTION

Pipes constructed from polymer materials have a multitude of uses, such as fluid transport, i.e. the transport of liquids, slurries and gases, e.g. water or natural gas. During transport, it is normal for the fluid to be pressurized. Moreover, the transported fluid may have varying temperatures, usually within the range from about 0° C. to about 50° C. Such pressurized pipes are preferably constructed from polyolefin plastics, usually unimodal or bimodal ethylene plastics such as medium density polyethylene (MDPE; density: 930-942 kg/m$^3$) and high density polyethylene (HDPE; density: 942-965 kg/m$^3$).

The expression "pressure pipe" used herein refers to a pipe which, when used, is subjected to a positive pressure, that is the pressure inside the pipe being higher than the pressure outside the pipe.

Polymeric pipes are generally manufactured by extrusion, or, to a small extent, by injection moulding. A conventional plant for extrusion of polymer pipes comprises an extruder, a die-head, a calibrating device, cooling equipment, a pulling device, and a device for cutting and/or for coiling up the pipe.

The manufacture of polyethylene materials for use in pressure pipes is discussed in an article by Scheirs et al (Scheirs, Böhm, Boot and Leevers: PE100 Resins for Pipe Applications, TRIP Vol. 4, No. 12 (1996) pp. 408-415). The authors discuss the production technology and properties of PE100 pipe materials. They point out the importance of proper comonomer distribution and molecular weight distribution in order to optimize slow crack growth and rapid crack propagation.

Whilst properties of conventional polymer pipes are sufficient for many purposes, enhanced properties may also be desired, for instance in applications requiring high pressure resistance, i.e. pipes that are subjected to an internal fluid pressure for long and/or short periods of time.

A problem when manufacturing large diameter pipes, particularly from multimodal polymer material, is that it is difficult to maintain uniform dimensions all over the pipe. This is due to gravity flow of the polymer melt, causing it to flow from the upper part of the pipe to the lower part (often called "sagging"). Thus, the wall thickness at the upper part of the pipe becomes smaller than at the lower part of the pipe. The sagging problem is particularly pronounced for thick-walled large diameter pipes, such as pipes with a wall thickness of at least 60 mm.

The above described sagging problem has been discussed in German patent application DE 19604196 A1. It discloses a process to manufacture a large-bore, thick walled pipe of polyethylene. The pipe is extruded through a ring formed die and cooled on both inner and outer surfaces. This double sided cooling is said to eliminate the deformation of the pipe due to gravity-induced flow of the melt emerging from the die.

International patent application WO 00/22040 discusses the improvement of the polyethylene composition for addressing the sagging problem. It was said that a bimodal polyethylene composition with a high viscosity at a low shear stress of 747 Pa improves sagging behavior of the polymeric melt.

There is a need for polyethylene compositions especially for pressure pipe applications which show low sagging behavior so that they are suitable for large diameter pipes with wall thicknesses of at least 60 mm and an optimized balance of properties as regards mechanical properties, pressure resistance and processability.

SUMMARY OF THE INVENTION

The present invention relates to a polyethylene composition comprising, preferably consisting of,
a base resin (A) comprising
  a copolymer of ethylene and at least one comonomer selected from alpha-olefins having from three to twelve carbon atoms,
  wherein the ethylene copolymer comprises a low molecular weight component (A-1) and a high molecular weight component (A-2) with the low molecular weight component (A-1) having a lower weight average molecular weight than the high molecular weight component (A-2),
(B) carbon black in an amount of 1.0 to 10 wt % based on the total amount of the polyethylene composition, and
(C) optional further additives other than carbon black;
wherein the base resin (A) has a density of equal to or more than 943 kg/m$^3$ to equal to or less than 957 kg/m$^3$, determined according to ISO 1183, and
the composition has a melt flow rate MFR$_5$ (190° C., 5 kg) of equal to or more than 0.12 g/10 min to equal to or less than 0.20 g/10 min, determined according to ISO 1133, a shear thinning index SHI$_{2.7/210}$ of equal to or more than 80 to equal to or less than 130 and a viscosity at a constant shear stress of 747 Pa, eta$_{747}$, of equal to or more than 700 kPas to equal to or less than 1200 kPas.

The polyethylene composition according to the invention surprisingly not only show a low sagging tendency as can be seen from a high viscosity at a low shear stress of 747 Pa, but also an improved balance of properties as regards mechanical properties, such as tensile properties, pressure resistance in the pressure pipe test and processability which can be seen in the rheological properties such as a higher shear thinning index.

The present invention further provides a polyethylene composition obtainable by a multistage process, the multistage process comprising
a) polymerizing ethylene in the presence of a Ziegler-Natta catalyst for obtaining an intermediate material,
b) transferring the intermediate material to a gas phase reactor
  (i) feeding ethylene and an alpha-olefin comonomer having from 3 to 12 carbon atoms to the gas phase reactor
  (ii) further polymerizing the intermediate material to obtain a base resin (A) which comprises the intermediate material polymerized in step a) and a material polymerized in step b) which has a higher weight average molecular weight as the intermediate material of step a), wherein the base resin (A) has a density of equal to or more than 943 kg/m$^3$ to equal to or less than 957 kg/m$^3$, determined according to ISO 1183,
c) extruding the base resin (A) in the presence of 1 to 10 wt % carbon black (B), based on the amount of the polyethylene composition, and optional further additive(s) (C), into a polyethylene composition having a melt flow rate MFR$_5$ (190° C., 5 kg) of equal to or more than 0.12 g/10 min to equal to or less than 0.20 g/10 min, determined according to ISO 1133, a shear thinning index SHI$_{2.7/210}$ of equal to or more than 80 to equal to or less than 130 and a viscosity at a constant shear stress of 747 Pa, eta$_{747}$, of equal to or more than 700 kPas to equal to or less than 1200 kPas.

In a further aspect, the present invention provides an article comprising the polyethylene composition according to the present invention.

In yet a further aspect, the present invention is concerned with the use of the inventive polyethylene composition for the production of an article.

Thereby, it is preferred that the article relates to a pipe or a pipe fitting, more preferably a pipe with a large wall thickness such as at least 60 mm.

Definitions

A polyethylene composition according to the present invention denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

An ethylene copolymer denotes a polymer consisting of ethylene monomer units and comonomer units in an amount of at least 0.1 mol %. In an ethylene random copolymer the comonomer units are randomly distributed in the polymer chain.

The term 'base resin (A)' denotes the polymeric component of the composition.

The term 'different' denotes that a polymeric component differs from another polymeric component in at least one measureable property. Suitable properties for differentiating polymeric components are weight average molecular weight, melt flow rate MFR$_2$ or MFR$_5$, density or comonomer content.

General

Base Resin (A)

The base resin (A) comprises a copolymer of ethylene and at least one comonomer selected from alpha-olefins having from three to twelve carbon atoms (referred herein also as ethylene copolymer).

Preferably the alpha olefin comonomers of the ethylene copolymer are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-hexene.

The ethylene copolymer may further comprise further comonomer units different from alpha olefin comonomers such as dienes, polar comononers or silicon containing comonomers. It is, however, preferred that the ethylene copolymer only contains alpha olefin monomers as comonomer units.

The ethylene copolymer comprises a low molecular weight component (A-1) and a high molecular weight component component (A-2). The low molecular weight component (A-1) differs from the high molecular weight component (A-2) by having a lower weight average molecular weight.

Preferably the base resin consists of the copolymer of ethylene and at least one comonomer, more preferably one comonomer, selected from alpha-olefins having from three to twelve carbon atoms.

The ethylene copolymer may further comprise further polymer component(s) different to the low molecular weight component (A-1) and the high molecular weight component (A-2). The further polymer component(s) can be introduced to the ethylene copolymer, the base resin or the polyethylene composition either by melt mixing or compounding or in an additional reaction stage of the multi-stage process for producing base resin of the polyethylene composition.

Components (A-1) and (A-2) differ in their weight average molecular weight in that component (A-2) has a higher weight average molecular weight as component (A-1). The differences in weight average molecular weight can be seen from the melt flow rate MFR$_2$ of component (A-1) which is higher than the melt flow rate MFR$_5$ of the polyethylene composition.

The MFR$_2$ (2.16 kg, 190° C.) of component (A-1) is equal to or more than 200 g/10 min, preferably equal to or more than 220 g/10 min, most preferably equal to or more than 240 g/10 min.

Further, the MFR$_2$ (2.16 kg, 190° C.) of component (A-1) is equal to or less than 400 g/10 min, preferably equal to or less than 390 g/10 min, more preferably equal to or less than 380 g/10 min.

Component (A-1) can be a homopolymer or copolymer of ethylene.

Component (A-1) in one embodiment can be a copolymer of ethylene with one or more alpha-olefins having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

The ethylene copolymer of component (A-1) preferably has a density of equal to or more than 955 kg/m$^3$ and of equal to or less than 965 kg/m$^3$, more preferably of equal to or more than 963 kg/m$^3$, and most preferably of equal to or more than 961 kg/m$^3$.

However, it is preferred that component (A-1) is an ethylene homopolymer. The homopolymer preferably has a density of at least 970 kg/m$^3$ and preferably of more than 970 kg/m$^2$.

Further, component (A-1) is preferably present in the base resin in an amount of 40 to 55 wt.-%, more preferably 45 to 54 wt.-%, most preferably 47 to 53 wt.-%, with respect to the base resin.

The high molecular weight component (A-2) is preferably a copolymer of ethylene and at least one alpha-olefin comonomers, preferably one alpha-olefin comonomer, with 3 to 12 carbon atoms.

Thereby, the alpha-olefin comonomer(s) used in the ethylene/alpha-olefin copolymer of the high molecular weight component (A-2) preferably are different to that/those used in the optional ethylene/alpha-olefin copolymer of the low molecular weight component (A-1).

Preferably the alpha olefin comonomer(s) of component (A-2) is/are selected from alpha olefins having from 4 to 8 carbon atoms, such as 1-butene, 1-hexene, 4-methyl-1-pentene and 1-octene. Especially preferred are 1-butene and 1-hexene and mostly preferred is 1-hexene.

Component (A-2) may further comprise further comonomer units different from alpha olefin comonomers such as dienes, polar comonoers or silicon containing comonomers. It is, however, preferred that the component (A-2) only contains alpha olefin monomers as comonomer.

It is especially preferred that the component (A-2) contains either 1-butene and/or 1-hexene as comonomer. Mostly preferred is 1-hexene as comonomer for component (A-2).

The content of units derived from at least one alpha olefin comonomer having from 3 to 12 carbon atoms in component (A-2) is preferably 0.3 to 2.5 mol %, more preferably 0.4 to 2.0 mol %.

Further, component (A-2) is preferably present in the base resin in an amount of 60 to 45 wt.-%, more preferably 55 to 46 wt.-%, and most preferably 53 to 47 wt.-%, with respect to the base resin.

The weight ratio of the low molecular weight component (A-1) to the high molecular weight component (A-2) is from 40:60 to 55:45, preferably from 45:55 to 54:46, most preferably from 47:53 to 53:47.

Optionally, the ethylene copolymer further comprises a prepolymer fraction. The prepolymer fraction preferably is an ethylene homopolymer or copolymer. The optional prepolymer fraction is preferably present in an amount of 0 to 5 wt.-%, more preferably in an amount of 0.2 to 3.5 wt.-% and most preferably in an amount of 0.5 to 2.5 wt.-%.

As regards the amount of the different polyethylene components (A-1) and (A-2) in the ethylene copolymer and the weight ratios of components (A-1) and (A-2) the optional prepolymer fraction is counted to the amount and the weight of component (A-1).

In one embodiment of the present invention the ethylene copolymer consists only of above defined components (A-1) and (A-2).

In another embodiment of the present invention the ethylene copolymer consists of components (A-1) and (A-2) and a prepolymer fraction as defined above.

The base resin (A) preferably consists of the low molecular weight component (A-1), the high molecular weight component (A-2) and the optional prepolymer as the polymer components.

The base resin (A) preferably has a density of equal to or more than 945 kg/m$^3$, more preferably of equal to or more than 947 kg/m$^3$.

The base resin (A) preferably has a density of equal to or less than 955 kg/m$^3$, more preferably of equal to or less than 953 kg/m$^3$ and most preferably of equal to or less than 952 kg/m$^3$.

The content of units derived from at least one alpha olefin comonomer having from 3 to 12 carbon atoms in the base resin (A) is preferably 0.05 to 2.0 mol %, more preferably 0.10 to 1.5 mol %, most preferably 0.20 to 1.0 mol %.

The base resin (A) is preferably present in the polyethylene composition in an amount of more than 80 wt %, more preferably in an amount of 85 to 99 wt %, most preferably in an amount of 90 to 98 wt %, based on the total amount of the polyethylene composition (100 wt %).

Polyethylene Composition

In addition to the base resin, the polymer composition may comprise and preferably comprises usual additives (C) for utilization with polyolefins, such as stabilizers (e.g. antioxidant agents), metal scavengers and/or UV-stabilizers, antistatic agents and utilization agents (such as processing aid agents). Preferably, the amount of these additives (C) is 10 wt % or below, more preferably 8 wt % or below, more preferably 5 wt % or below, of the composition (100 wt %).

Further preferred, the amount of additives (C) different from carbon black is 0 wt % to 1 wt %, more preferably 0.001 wt % to 0.8 wt %.

The polyethylene composition comprises carbon black (B) in an amount of 1.0 to 10 wt %, preferably 1.5 to 9.0 wt %, more preferably 1.8 to 8.0 wt %, still more preferably 1.8 to 7.0 wt %, still more preferably 1.8 to 5.0 wt %, still more preferably 1.8 to 4.5 wt % and most preferably 1.8 to 4.0 wt %, based on the total amount of the composition.

Carbon black (B) can be added to polymer composition as such (neat) or in form of so-called master batch (CBMB), in which carbon black, and optionally further additives (C) as defined above, are contained in concentrated form in a carrier polymer.

The optional carrier polymer of carbon black masterbatch is not calculated to the amount of the polymer components present in the polyethylene composition. In other words, it is to be understood that carbon black (B) and optional additive(s) (C) may be added to the polymer composition in form of a masterbatch, i.e. together with a carrier polymer. In such case the carrier polymer is not considered as polymer component(s), but is calculated into the amount (wt %) of carbon black (B) or, respectively, into the amount (wt %) of additive(s) (C).

The amount of the optional carrier polymer of the carbon black master batch is 0 to 5 wt % based on the total amount of the polymer composition (100 wt %).

The polyethylene composition according to the present invention has a melt flow rate MFR$_5$ (190° C., 5 kg) of equal to or more than 0.12 g/10min, preferably equal to or more than 0.13 g/10 min, and most preferably equal to or more than 0.14 g/10 min.

Further, the polyethylene composition has a melt flow rate MFR$_5$ (190° C., 5 kg) of equal to or less than 0.20 g/10 min, preferably equal to or less than 0.19 g/10 min.

The polyethylene composition according to the present invention preferably has a melt flow rate MFR$_{21}$ (190° C., 21.6 kg) of equal to or more than 5.6 g/10 min, more preferably equal to or more than 5.9 g/10 min.

Further, the polyethylene composition preferably has a melt flow rate MFR$_{21}$ (190° C., 21.6 kg) of equal to or less than 7.0 g/10min, preferably equal to or less than 6.5 g/10min, and most preferably equal to or less than 6.4 g/10 min.

The MFR$_2$ (190° C., 2.16 kg), MFR$_5$ (190° C., 5 kg) and the MFR$_{21}$ (190° C., 21.6 kg) are determined according to ISO 1133.

The polyethylene composition according to the present invention preferably has a density of equal to or more than 956 to 964 kg/m$^3$, determined according to ISO 1183-1: 2004.

The polyethylene composition has a shear thinning index SHI$_{2.7/210}$ of 80 to 130, more preferably a shear thinning index SHI$_{2.7/210}$ of 90 to 125, and most preferably a shear thinning index SHI$_{2.7/210}$ of 95 to 120.

The polyethylene composition preferably has a shear thinning index SHI$_{5/200}$ of 50 to 100, more preferably a shear thinning index SHI$_{5/200}$ of 55 to 90, and most preferably a shear thinning index SHI$_{5/200}$ of 60 to 80.

The shear thinning indexes SHI$_{2.7/210}$ and SHI$_{5/200}$ are a rheological measure indicating the broadness of the polymer. Thus SHI can be modified e.g. by varying the relative amounts of low and high molecular weight material (via split of the reactors) and/or by varying the molecular weights of the respective low and high molecular weight materials for example by variation of the chain transfer agent feed, as evident to a skilled person.

The polyethylene composition has a viscosity eta$_{747}$ of equal to or more than 700 kPas, more preferably of equal to or more than 750 kPas.

The viscosity $eta_{747}$ of the polyethylene composition is preferably equal to or less than 1200 kPas, most preferably equal to or less than 1000 kPas.

The viscosity $eta_{747}$ is measured at a very low, constant shear stress of 747 Pa and is inversely proportional to the gravity flow of the polyethylene composition. I.e. the higher $eta_{747}$ the lower the sagging of the polyethylene composition. Herein the higher $eta_{747}$ indicates the presence of high molecular weight polymer chains and higher molecular weight Mz and also higher Mw.

The polyethylene composition according to the present invention preferably has a complex viscosity at 0.05 rad/s eta* of 170 000 Pa·s to 300 000 Pa·s, more preferably 200 000 Pa·s to 275 000 Pa·s, and most preferably 220 000 Pa·s to 250 000 Pa s.

The polyethylene composition according to the present invention preferably has a complex viscosity at 300 rad/s eta* of 1050 Pa·s to 1500 Pa s, more preferably 1080 Pa·to 1250 Pa s, and most preferably 1100 Pa·s to 1200 Pa s.

The polyethylene composition according to the present invention preferably has a weight average molecular weight, Mw, in the range of 250 to 360 kg/mol, more preferably 260 to 340 kg/mol.

The polyethylene composition according to the present invention preferably has a Mz value in the range of 1600 to 2500 kg/mol, preferably 1700 to 2200 kg/mol even more preferably 1750 to 2150 kg/mol. Mz indicates the portion (amount) and the Mw of the very high molecular weight fraction.

Further the polyethylene composition preferably has a molecular weight distribution, being the ratio of the weight average molecular weight to the number average molecular weight, Mw/Mn, of at least 25, preferably 30 to 50, more preferably 30 to 45, most preferably 32 to 42.

The polyethylene composition of the invention with the specific property balance between density, MFR, viscosity at low shear stress and shear thinning index provide not only low sagging behavior but also highly advantageous mechanical properties e.g. for pipe applications (expressed e.g. as tensile modulus), and processability properties, when the polyethylene composition is processed to articles, preferably pipes, as well as desirable resistance to internal pressure when tested using pipe samples of the polyethylene composition.

The composition according to the present invention has a tensile modulus, determined according to ISO 527-2:1993 at a temperature of 23° C. of equal to or less than 1250 MPa, preferably of equal to or less than 1200 MPa, and most preferably of equal to or less than 1100 MPa. The lower limit of the tensile modulus at 23° C. is usually not lower than 800 MPa, preferably not lower than 950 MPa.

In a further aspect, the present invention is concerned with a polyethylene composition obtainable by a multistage process, the multistage process comprising
 a) polymerizing ethylene in the presence of a Ziegler-Natta catalyst for obtaining an intermediate material,
 b) transferring the intermediate material to a gas phase reactor
   (i) feeding ethylene and an alpha-olefin comonomer having from 3 to 12 carbon atoms to the gas phase reactor
   (ii) further polymerizing the intermediate material to obtain a base resin (A) which comprises the intermediate material polymerized in step a) and a material polymerized in step b) which has a higher weight average molecular weight as the intermediate material of step a), wherein the base resin (A) has a density of equal to or more than 943 kg/m$^3$ to equal to or less than 957 kg/m$^3$, determined according to ISO 1183,
 c) extruding the base resin (A) in the presence of 1 to 10 wt % carbon black (B), based on the amount of the polyethylene composition, and optional further additive(s) (C), into a polyethylene composition having a melt flow rate $MFR_S$ (190° C., 5 kg) of equal to or more than 0.12 g/10 min to equal to or less than 0.20 g/10 min, determined according to ISO 1133 (type II), a shear thinning index $SHI_{2.7/210}$ of equal to or more than 80 to equal to or less than 130 and a viscosity at a constant shear stress of 747 Pa, $eta_{747}$, of equal to or more than 700 kPas to equal to or less than 1200 kPas.

The base resin (A) and the polyethylene composition obtainable by the above described multistage process are preferably further defined by the properties of the base resin (A) and the polyethylene composition described above or in claims.

Most preferably the polyethylene composition consists of the base resin (A), carbon black (B) and optional further additives other than carbon black (C).

Article

In yet a further aspect, the present invention is concerned with an article comprising, preferably consisting of, the polyethylene composition as described above or below in claims.

Thereby, in the preferred embodiment of the present invention the article is a pipe or pipe fitting comprising, preferably consisting of, the polyethylene composition as described above or below in claims. Most preferably the article is a pipe, especially a pipe with a wall thickness of at least 60 mm.

Process

The polyethylene compositions of the present invention are usually made by a multi-stage process, i.e. a process which makes use of at least two reactors, one for producing a lower molecular weight component (A-1) and a second for producing a higher molecular weight component (A-2). These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Multimodal polyethylene compositions of the present invention are preferably produced in a multistage process, where lower molecular weight and higher molecular weight polymers (components A-1 and A-2) are produced in different polymerization steps, in any order.

A high molecular weight (HMW) polymer component (=relatively low density) (A-2) can be prepared in the first polymerization step and a low molecular weight (LMW) polymer component (=relatively high density) (A-1) in the second polymerization step. This can be referred to as the reverse mode. Alternatively, the low molecular weight polymer component (A-1) can be prepared in the first polymerization step and the high molecular weight polymer component (A-2) in the second polymerization step. This can be referred to as the normal mode and is preferred.

A two-stage process can, for example be a slurry-slurry or a gas phase-gas phase process, particularly preferably a slurry-gas phase process. Optionally the process according to the invention can comprise one or two additional polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in US-A-4582816, US-A-3405109, US-A-3324093, EP-A-479186 and US-A-5391654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

The slurry and gas phase processes are well known and described in the prior art.

In a preferred embodiment of the invention the low molecular weight (LMW) component (A-1) is produced first and the high molecular weight (HMW) component (A-2) is produced in the presence of LMW component (A-1). In this case the LMW component is the first polyethylene component (A-1) and the HMW component is the second polyethylene component (A-2).

The polymerisation catalysts for the production of the base resin may include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a MgCl$_2$-based ZN catalyst.

The Ziegler-Natta catalyst further preferably comprises a group 4 (group numbering according to new IUPAC system) metal compound, preferably titanium, magnesium dichloride and aluminum.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal polyethylene composition according to the invention is a bimodal polyethylene mixture consisting of polymer components (A-1) and (A-2), optionally further comprising a small prepolymerisation fraction. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C. The pressure in the loop reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

The ethylene content in the fluid phase of the slurry in the slurry phase reactor may be from 0.5 to 50% by mole, preferably from 1 to 20% by mole, and in particular from 2 to 10% by mole.

In a preferred embodiment of a gas phase reactor, the polymerization takes place in a fluidised bed gas phase reactor where an olefin is polymerised in the presence of a polymerisation catalyst in an upwards moving gas stream. The reactor typically contains a fluidised bed comprising the growing polymer particles containing the active catalyst located above a fluidisation grid. The polymer bed is fluidised with the help of a fluidisation gas comprising the olefin monomer, eventually comonomer(s), eventually chain growth controllers or chain transfer agents, such as hydrogen, and eventually inert gas.

Also antistatic agent(s) may be introduced into the gas phase reactor if needed. Suitable antistatic agents and methods to use them are disclosed, amongst others, in U.S. Pat.

Nos. 5,026,795, 4,803,251, 4,532,311, 4,855,370 and EP-A-560 035. They are usually polar compounds and include, amongst others, water, ketones, aldehydes alcohols.

A chain-transfer agent, preferably hydrogen, is added as required to the reactors, and preferably 500 to 1200 moles of $H_2$/kmoles of ethylene are added to the reactor, when the LMW component (A-1) is produced in this reactor, and 0 to 100 moles of $H_2$/kmoles of ethylene are added to the gas phase reactor when this reactor is producing the HMW component (A-2).

The polymerization process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C. and more preferably from 40 ° C. to 70° C.

The pressure is not critical and is typically from 1 bar to 150 bar, preferably from 10 bar to 100 bar.

The amount of monomer is typically such that from 0.1 grams to 1000 grams of monomer per one gram solid catalyst component is polymerised in the pre-polymerisation step. As the person skilled in the art knows, the catalyst particles recovered from a continuous pre-polymerisation reactor do not all contain the same amount of pre-polymer. Instead, each particle has its own characteristic amount which depends on the residence time of that particle in the pre-polymerisation reactor. As some particles remain in the reactor for a relatively long time and some for a relatively short time, then also the amount of pre-polymer on different particles is different and some individual particles may contain an amount of pre-polymer which is outside the above limits. However, the average amount of pre-polymer on the catalyst typically is within the limits specified above.

In addition to ethylene monomer it is possible to use one or more alpha-olefin comonomers in the pre-polymerisation step if desired. Suitable comonomers are, for example, 1-butene, 1-hexene, 4-methyl-1-pentene, 1-octene and their mixtures.

It is however preferred that in the pre-polymerization step an ethylene homopolymer prepolymer fraction is polymerized.

The molecular weight of the pre-polymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the pre-polymerisation step. However, where the solid catalyst component and the cocatalyst can be fed separately it is possible that only a part of cocatalyst is introduced into the pre-polymerisation stage and the remaining part into the subsequent polymerisation stages. Also in such cases it is necessary to introduce as much cocatalyst into the pre-polymerisation stage as necessary to obtain a sufficient polymerisation reaction.

The polymerization conditions as well as the feed streams and the residence time in the reactors are preferably adapted as such to produce a base resin (A) as described above or in the claims below.

Carbon Black (B), and optionally additives (C) or other polymer components, are added to the composition during the compounding step in the amount as described above. Preferably, the polyethylene composition of the invention obtained from the reactor is compounded in the extruder together with carbon black (B) and optional additives (C) in a manner known in the art.

The composition of the invention, preferably if produced in a process comprising a compounding step, wherein the composition, i.e. the blend, which is typically obtained as a polyolefin base resin powder from the reactor, is extruded in an extruder and then pelletized to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Use

Furthermore, the present invention relates to an article, preferably a pipe or pipe fitting, preferably pipe, and to the use of such a polyethylene composition for the production of an article, preferably a pipe or pipe fitting, most preferably a pipe. Especially preferred are pipes with a wall thickness of at least 60 mm, more preferably at least 75 mm.

Pipes can be produced from the polyethylene composition according to the present invention according to the methods known in the art. Thus, according to one preferred method the polyethylene composition is extruded through an annular die to a desired internal diameter, after which the polyethylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

The fittings can be produced by conventional moulding processes, like injection moulding processes, which are well known to a skilled person.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in $kg/m^3$.

c) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]} and the RSHEPT decoupling scheme {[4], [5]}. A total of 1024 (1k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal ($\delta+$) at 30.00 ppm {[9]}.

Characteristic signals corresponding to the incorporation of 1-hexene were observed {[9]} and all contents calculated with respect to all other monomers present in the polymer.

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2s and 3s sites respectively:

$$S=(1/2)*(I_{2S}+I_{3S})$$

The relative content of ethylene was quantified using the integral of the bulk methylene ($\delta+$) signals at 30.00 ppm:

$$E=(1/2)*I_{\delta+}$$

The total ethylene comonomer content was calculated based on the bulk methylene signals and accounting for ethylene units present in other observed comonomer sequences or end-groups:

$$E_{total}=E+(5/2)*B+(3/2)*S$$

The total mole fraction of 1-hexene in the polymer was then calculated as:

$$fH=(H_{total}/(E_{total}+H_{total})$$

The total comonomer incorporation of 1-hexene in mole percent was calculated from the mole fraction in the usual manner:

$$H[mol\%]=100*fH$$

The total comonomer incorporation of 1-hexene in weight percent was calculated from the mole fraction in the standard manner:

$$H[wt\%]=100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Reson. 2005, 176, 239.

[5] Griffin, J. M., Tripon, C., Samoson, A., Filip, C., and Brown, S. P., Mag. Res. in Chem. 2007, 45, S1, S198.

[6] Castignolles, P., Graf, R., Parkinson, M., Wilhelm, M., Gaborieau, M., Polymer 50 (2009) 2373.

[7] Zhou, Z., Muemmerle, R., Qiu, X., Redwine, D., Cong, R., Taha, A., Baugh, D. Winniford, B., J. Mag. Reson. 2007, 187, 225.

[8] Busico, V., Carbonniere, P., Cipullo, R., Pellecchia, R., Severn, J., Talarico, G., Macromol. Rapid Commun. 2007, 28, 1128.

[9] J. Randall, Macromol. Sci., Rev. Macromol. Chem. Phys. 1989, C29, 201.

d) Dynamic Shear Measurements (Frequency Sweep Measurements)

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta"$, and the loss tangent, tan $\eta$, which can be expressed as follows:

$$G' = \frac{\sigma_0}{\gamma_0}\cos\delta \ [Pa] \quad (3)$$

$$G'' = \frac{\sigma_0}{\gamma_0}\sin\delta \ [Pa] \quad (4)$$

$$G^* = G' + iG'' \ [Pa] \quad (5)$$

$$\eta^* = \eta'' - i\eta'' \ [Pa \cdot s] \quad (6)$$

$$\eta' = \frac{G''}{\omega} \ [Pa \cdot s] \quad (7)$$

$$\eta'' = \frac{G''}{\omega} \ [Pa \cdot s] \quad (8)$$

Besides the above mentioned rheological functions one can also determine other rheological parameters such as the so-called elasticity index EI(x). The elasticity index EI(x) is the value of the storage modulus, G', determined for a value of the loss modulus, G", of x kPa and can be described by equation 9.

$$EI(x)=G' \text{ for } (G''=x \text{ kPa}) \ [Pa] \quad (9)$$

For example, the EI(5 kPa) is defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \text{ kPa})}{Eta^* \text{ for } (G^* = y \text{ kPa})} \ [Pa] \quad (10)$$

For example, the $SHI_{(2.7/210)}$ is defined by the value of the complex viscosity, in Pa·s, determined for a value of G* equal to 2.7 kPa, divided by the value of the complex viscosity, in Pa·s, determined for a value of G* equal to 210 kPa The values of storage modulus (G'), loss modulus (G"), complex modulus (G*) and complex viscosity ($\eta^*$) were obtained as a function of frequency ($\omega$).

Thereby, e.g. $\eta^*_{300rad/s}$ (eta*$_{300rad/s}$) is used as abbreviation for the complex viscosity at the frequency of 300 rad/s and $\eta^*_{0.05rad/s}$ (eta*$_{0.05rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

e) Eta 747 Pa (Sagging):

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. An 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

f) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

-continued $$M_w = \frac{\sum_{i=1}^{N}(A_i \times M_i)}{\sum A_i} \quad (2)$$

$$M_z = \frac{\sum_{i=1}^{N}(A_i \times M_i^2)}{\sum(A_i/M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3×Olexis and 1×Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200μL of sample solution were injected per analysis. The column set was calibrated using universal calibration (according to ISO 16014-2:2003) with at least 15 narrow MWD polystyrene (PS) standards in the range of 0,5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

g) Tensile Modulus (23° C.)

As a measure for stiffness, the tensile modulus (E-modulus) of the compositions was measured at 23° C. on compression molded specimens according to ISO 527-2:1993. The specimens (1B type) were cut from plaques of 4 mm thickness prepared by compression molding according to ISO 293:2004 using the conditions defined in chapter 3.3 of ISO 1872-2:2007. The modulus was measured at a speed of 1 mm/min.

h) Tensile Properties (23° C.)

The tensile strength, including tensile stress at yield, strain at yield and elongation at break (i.e. tensile strain at break) is measured according to ISO 527-1 (cross head speed 50 mm/min) at a temperature of 23° C.

i) Pressure Test on Un-Notched Pipes (PT); Resistance to Internal Pressure

The resistance to internal pressure has been determined in a pressure test on pressure test on un-notched 32 mm SDR 11 pipes having a length of 450 mm is carried out in water-inside and water-outside environment according to ISO 1167-1:2006. End caps of type A were used. The time to failure is determined in hours. The following conditions were applied: hoop stress of 5.5 MPa at a temperature of 80° C.

2. Materials a) Inventive Example Ex1

Into a first loop reactor having a volume of 50 dm³ and operating at a temperature of 60° C. and a pressure of 65 bar propane (C3, 50 kg/h), ethylene (C2, 2 kg/h), and hydrogen (H2, 10 g/h) were introduced for conducting a pre-polymerization step. In addition a commercially available, solid polymerisation catalyst component Lynx 200™ sold by BASF Catalyst LLC was introduced into the reactor together with triethylaluminium cocatalyst so that the ratio of aluminium to titanium was 15 mol/mol. The polymerization rate was 1.9 kg/h.

The slurry was withdrawn intermittently from the prepolymerization reactor and directed to a second loop reactor having a volume of 500 dm³ and operating at a temperature of 95° C. and a pressure of 65 bar. Additionally, propane, ethylene and hydrogen were fed to the second loop reactor whereby the ethylene concentration and the hydrogen to ethylene ratio for example Ex 1 are listed in Table 1. The production split, the density and melt index of the polymer fractions produced in the second loop reactor are listed in Table 1.

The slurry was withdrawn intermittently from the second loop reactor by using settling legs and directed to a gas phase reactor. The gas phase reactor was operated at a temperature of 85 ° C. and a pressure of 20 bar. Additional ethylene, 1-hexene comonomer, and hydrogen were fed whereby the ethylene concentration, the 1-hexene to ethylene ratio and the hydrogen to ethylene ratio as well as the production split and the density of the polymers of example Ex 1 withdrawn from the gas phase reactor are listed in Table 1.

The resulting polymer was purged with nitrogen (about 50 kg/h) for one hour, stabilised with commercial stabilisers, 1100 ppm of Irganox 1010, 1100 ppm Irgafos 168 and 1500 ppm Ca-stearate and then extruded together with 3.0 wt % carbon black to pellets in a counter-rotating twin screw extruder CIM90P (manufactured by Japan Steel Works) The temperature profile in each zone was 90/120/190/250° C.

The properties of the compounded composition are shown in Table 1.

b) Comparative Example CE2

As comparative example CE2 commercially available black bimodal HDPE grade for PE100 pipes (for thick wall pipes) has been tested. The properties of the PE100 HDPE resin are shown in Table 1.

c) Pipe Preparation

The compounded compositions of Inventive Example Ex1 and Comparative Examples CE1 were extruded to SDR 11 pipes for the pressure resistance tests in a Battenfeld 1-60-35-B extruder at a screw speed of about 200 rpm, and the conditions as listed in Table 2. The temperature profile in each barrel zone was 220/210/210/210/210° C.

The results of the pipe tests are shown in Table 2.

TABLE 1

| Polymerization conditions | |
|---|---|
| | Ex1 |
| Prepolymerizer: | |
| Temperature [° C.] | 60 |
| Pressure [bar] | 65 |
| Split [wt %] | 2.3 |
| Loop: | |
| Temperature [° C.] | 95 |
| Pressure [bar] | 65 |
| H$_2$/C$_2$ [mol/kmol] | 1050 |
| C$_2$-concentration [mol %] | 2.6 |
| Production Rate [kg/h] | 37 |
| Split [wt %] | 48.7 |
| MFR$_2$ [g/10 min] | 325 |
| Density [kg/m³] | 970 |
| Gas phase: | |
| Temperature [° C.] | 85 |
| Pressure [bar] | 20 |
| H$_2$/C$_2$ [mol/kmol] | 12.6 |
| C$_6$/C$_2$ [mol/kmol] | 68 |

TABLE 1-continued

| Polymerization conditions | |
| --- | --- |
| $C_2$-concentration [mol %] | 15 |
| Production Rate [kg/h] | 38 |
| Split [wt %] | 49 |
| Density [kg/m³] | 949 |

| Composition Properties: | Ex. 1 | CE2 |
| --- | --- | --- |
| Density [kg/m³] | 962 | 961 |
| $MFR_5$ [g/10 min] | 0.16 | 0.17 |
| $MFR_{21}$ [g/10 min] | 6.2 | 6.6 |
| $FRR_{21/5}$ | 39 | 39 |
| Mw [kg/mol] | 285 | 267 |
| Mz [kg/mol] | 1885 | 1705 |
| MWD (Mw/Mn) | 36 | 19 |
| Eta (0.05 rad/s) [Pa · s] | 234000 | 282000 |
| Eta (300 rad/s) [Pa · s] | 1141 | 1265 |
| $SHI_{2.7/210}$ | 109 | 72 |
| $SHI_{5/200}$ | 69 | 49 |
| $Eta_{747}$ [kPa · s] | 868 | 870 |
| $C_6$ content [mol %] | 0.80 | |
| Tensile Modulus [MPa] | 1042 | 1300 |
| Tensile Strength [MPa] | 28.4 | 37 |
| Tensile Stress at yield [MPa] | 28.4 | 25 |
| Elongation at break [%] | 640 | 760 |

TABLE 2

| Pipe Properties | |
| --- | --- |
| | Ex1 |
| Pipe Extrusion | |
| Melt Pressure, 32 mm [bar] | 315 |
| Melt Temperature, 32 mm [° C.] | 200 |
| Melt Pressure, 110 mm [bar] | 321 |
| Melt Temperature, 110 mm [° C.] | 190 |
| Pressure Test | |
| 80° C., 5.5 MPa [h] | 240 |
| Failure mode | D |

Failure mode: D = ductile failure mode
B = brittle failure mode

The invention claimed is:

1. A bimodal polyethylene composition consisting of a bimodal base resin (A) comprising:
a copolymer of ethylene and at least one comonomer selected from alpha-olefins having from three to twelve carbon atoms,
wherein the ethylene copolymer comprises a low molecular weight component (A-1) and a high molecular weight component (A-2) with the low molecular weight component (A-1) having a lower weight average molecular weight than the high molecular weight component (A-2),
(B) carbon black in an amount of 1.0 to 10 wt % based on the total amount of the polyethylene composition, and
(C) optional stabilizing additives;
wherein the base resin (A) has a density of equal to or more than 943 kg/m³ to equal to or less than 957 kg/m³, determined according to ISO 1183, and
the composition has a melt flow rate MFR5 (190° C., 5 kg) of equal to or more than 0.12 g/10 min to equal to or less than 0.20 g/10 min, determined according to ISO 1133, a melt flow rate $MFR_{21}$ (190° C., 21.6 kg) of equal to or more than 5.6 g/10 min to equal to or less than 6.5 g/10 min, determined according to ISO 1133, a shear thinning index $SHI_{2.7/210}$ of equal to or more than 120 to equal to or less than 130 and a viscosity at a constant shear stress of 747 Pa, $eta_{747}$, of equal to or more than 700 kPas to equal to or less than 1200 kPas, and
wherein the low molecular weight component (A-1) has a melt flow rate $MFR_2$ (190° C., 2.16 kg) of 200 g/10 min to 400 g/10 min, determined according to ISO 1133.

2. The bimodal polyethylene composition according to claim 1, wherein the low molecular weight component (A-1) is an ethylene homopolymer.

3. The bimodal polyethylene composition according to claim 1, wherein the high molecular weight component (A-2) is a copolymer of ethylene and a comonomer selected from alpha-olefins having from three to twelve carbon atoms.

4. The bimodal polyethylene composition according to claim 1, wherein the weight ratio of the low molecular weight component (A-1) to the high molecular component (A-2) is from 45:55 to 55:45.

5. The bimodal polyethylene composition according to claim 1, wherein the composition has a density of equal to or more than 953 kg/m³ to equal to or less than 967 kg/m³, determined according to ISO 1183.

6. The bimodal polyethylene composition according to claim 1, wherein the composition has a shear thinning index $SHI_{5/200}$ of equal to or more than 50 to equal to or less than 100.

7. The bimodal polyethylene composition according to claim 1, wherein the composition has at least one of the following properties a) a weight average molecular weight, Mw, of 250 to 360 kg/mol, and/or b) Mz value of 1600 to 2500 kg/mol.

8. The bimodal polyethylene composition according to claim 1, wherein the composition has a molecular weight distribution Mw/Mn, of at least 25.

9. The bimodal polyethylene composition according to claim 1, wherein the composition has a tensile modulus of equal to or less than 1250 MPa, determined according to ISO 527-2:1993.

10. A bimodal polyethylene composition consisting of a bimodal base resin (A) comprising:
a copolymer of ethylene and at least one comonomer selected from alpha-olefins having from three to twelve carbon atoms,
wherein the ethylene copolymer comprises a low molecular weight component (A-1) and a high molecular weight component (A-2) with the low molecular weight component (A-1) having a lower weight average molecular weight than the high molecular weight component (A-2),
(B) carbon black in an amount of 1.0 to 10 wt % based on the total amount of the polyethylene composition, and
(C) optional stabilizing additives other than carbon black,
wherein the optional further additives other than carbon black (C) are selected from the group consisting of antioxidant agents, metal scavengers and/or UV stabilizers, antistatic agents, processing aid agents and combinations thereof;
wherein the base resin (A) has a density of equal to or more than 943 kg/m³ to equal to or less than 957 kg/m³, determined according to ISO 1183, and
the composition has a melt flow rate $MFR_5$ (190° C., 5 kg) of equal to or more than 0.12 g/10 min to equal to or less than 0.20 g/10 min, determined according to ISO 1133, a melt flow rate $MFR_{21}$ (190° C., 21.6 kg) of equal to or more than 5.6 g/10 min to equal to or less than 6.5 g/10 min, determined according to ISO 1133, a shear thinning index $SHI_{2.7/210}$ of equal to or more 120 to equal to or less than 130 and a viscosity at a constant shear stress of 747 Pa, $eta_{747}$, of equal to or more than 700 kPas to equal to or less than 1200 kPas, and wherein the low molecular weight component (A-1) has a melt flow rate $MFR_2$ (190° C., 2.16 kg) of 200 g/10 min to 400 g/10 min, determined according to ISO 1133.

11. The bimodal polyethylene composition according to claim 10, wherein the bimodal base resin (A) consists of the copolymer of ethylene and at least one comonomer selected from alpha-olefins having from three to twelve carbon atoms.

* * * * *